United States Patent
Deichman

[19]

[11] Patent Number: 6,052,941
[45] Date of Patent: Apr. 25, 2000

[54] PLANT ARRANGEMENT FOR IMPROVING CROP YIELDS

[75] Inventor: Charles L. Deichman, Gibson City, Ill.

[73] Assignee: Maize Research Umlimited, Inc., Paxton, Ill.

[21] Appl. No.: 08/905,384

[22] Filed: Aug. 4, 1997

Related U.S. Application Data

[63] Continuation of application No. 08/608,099, Feb. 28, 1996, which is a continuation of application No. 08/374,128, Jan. 18, 1995.

[51] Int. Cl.[7] .................................................. A01G 1/00
[52] U.S. Cl. ............................................................ 47/1.01
[58] Field of Search ............................................. 47/1.01

[56] References Cited

U.S. PATENT DOCUMENTS 4,611,683  9/1986  Hilmer ........................ 111/52

FOREIGN PATENT DOCUMENTS

| 615891 | 7/1978 | Russian Federation | 47/58 T |
| 680672 | 8/1979 | Russian Federation | 47/1.01 F |
| 1491400 | 6/1989 | Russian Federation | 47/58 T |
| 1713494 | 2/1992 | Russian Federation | 47/58 T |
| 1720562 | 3/1992 | Russian Federation | 47/58 T |

OTHER PUBLICATIONS

BCS The Toughest Tiller . . . Apr. 1985.
Multiple Cropping: by A.S.A 1981 pp. 129–135, 171–222.
Organic Gardening Feb. 1982 pp. 40–49, 73–75, 82–93.

*Primary Examiner*—Michael J. Carone
*Assistant Examiner*—Joanne C. Downs
*Attorney, Agent, or Firm*—Knechtel, Demeur & Samlan

[57] ABSTRACT

A planting arrangement and method to improve crop yields in open fields is provided in which there is a solar light corridor between crop rows and in some situations a plurality of sub-rows between the solar corridors and/or a secondary crop planted in the solar corridor. Orientation of the rows for greater crop yield is also disclosed.

11 Claims, 2 Drawing Sheets

PLANT ARRANGEMENT FOR IMPROVING CROP YIELDS

CROSS REFERENCES TO RELATED APPLICATIONS

This is a continuation in part of application Ser. No. 08/608,099 filed on Feb. 28, 1996, which is a continuation of application Ser. No. 08/374,128 filed on Jan. 18, 1995.

FIELD OF THE INVENTION

This invention relates generally to plant husbandry and, more specifically, to a plant arrangement and a method of planting which improves crop yields. More particularly, it relates to growing varieties of Zea mays L., or corn.

BACKGROUND OF THE INVENTION

Success in plant husbandry is measured by the quantity and quality of the desired crop which is produced, whether the crop is seed or grain such as corn, wheat or soybeans; fruit such as grapes, apples, oranges or tomatoes; or other parts of the plant such as tubers (potatoes, for example) or leaves (lettuce, for example).

Quality is measured with respect to various desired characteristics of the particular crop such as moisture content, acidity or alkalinity, shape, color, taste, etc. Quality depends on many factors which, outside of special and expensive artificial environments such as hydroponic farming in greenhouses, are difficult to control. In a field, the chemical and physical makeup of the soil may be altered by application of fertilizers, chemicals, crop rotation and different methods of cultivation. The timing and extent of rainfall, if inadequate, may be supplemented by spraying or irrigation systems.

Soil and air temperatures are largely uncontrollable outside of artificial enclosures. Efforts usually must be made to control weeds and insects which interfere with plant growth.

Quality and quantity are sometimes antithetical goals. For example, a prize winning tomato weighing several pounds might not be very tasty. However, in general, larger quantities of crop yield are desirable if the input in the cost and labor of producing a larger crop is less than the financial return from the increase in the crop yield.

Crop yield is measured in various ways for different types of crops. For most varieties of Zea mays L., commonly referred to as corn, which is grown in the United States, yield is measured in bushels produced per acre of planted land. The term "bushel" may have more than one meaning. According to the American College Dictionary, the term may mean a unit of dry measure, which is to say "volume", equal to 2,150.42 cubic inches in the United States. In Great Britain, the Imperial bushel is equal to 2,219.36 cubic inches. A "bushel" may also be a unit of weight equal to the weight of a volume based bushel of a given commodity.

The term "bushel", as used herein to explain crop yield, means 56 pounds of shelled (removed from the corn cob) corn having 15.0% moisture and 2.0% foreign material (husks, cob pieces, dirt, other grains, etc.). This is the standard for "No. 2 Yellow Corn" as defined by the Federal Grain Inspection Service. It is the standard used in the purchase of grain from the farmer by elevators, in sales by elevators to users or traders, and in trading on the commodities and futures markets. It is also the standard used in agronomic research to measure results of experiments.

Since it would be coincidence for almost any load of shelled corn to exactly match the standard in all respects, in measuring yield the gross weight of the shelled corn is adjusted for deviations from the standard. In addition, shelled corn may be dried, particularly if storage is contemplated, thus reducing its gross weight but also reducing any downward adjustment of the dried weight to measure the adjusted weight and the yield.

Corn intended for direct human consumption usually called "sweet corn", in commercial sales is measured by the ton and includes the corn cobs. Thus, this is also a measure by weight, rather than by volume or number of ears. Such a measure is roughly comparable to the standard bushel measurement described above. In agronomic studies of corn yield, even for sweet corn, the No. 2 Yellow Corn standard is used because it is more precise. The present planting arrangement and method is applicable to sweet corn as well as for corn not intended for direct human consumption.

Thus, as set forth in this application and in the claims, "yield" means the number of bushels of shelled corn adjusted to the No. 2 Yellow Corn standard produced per acre of planted farmland.

The term "corn" is also an ambiguous term. Broadly, it can refer to any edible grain such as wheat in England and barley in Scotland. Generally in the United States and other parts of the Western hemisphere, it refers to a member of the maize family, which was cultivated, bred and improved by natives of the Western hemisphere and has been, over the last century or more, extensively bred and hybridized for greater usefulness to mankind. As used herein the term corn refers only to a variety of Zea mays L.

Even within this group there are great variations in a number of characteristics. One of these is the full grown height of the corn plant. For example, there is bantam corn which typically grows to about four feet in height and varieties grown in Central America which mature with a height of about twelve feet.

Applicant's experiments utilized several varieties of corn widely used in the Midwestern part of the United States which normally attain a full grown height, on average, of 8.5 feet or 102 inches. Of course, the eventual height of individual plants will vary depending on growing conditions. Unless otherwise indicated by the context in this application, "height" means normal full grown height attained by a corn plant of any variety.

All crops are produced as a result of photosynthesis, the conversion of energy in the form of light to plant material. Simplistically, it could be hypothesized that if more light were applied to plants, they would grow more and produce greater yields. U.S. Pat. Nos. 3,324,593 and 3,931,695 are examples of expensive enclosed and controlled environment systems that supply artificial light to plants to supplement natural light.

Applicant's invention uses only natural light in an unenclosed environment.

Working only in an unenclosed environment, others have proposed alternating rows of short plants and tall plants so that increased light reaches the higher leaves of the tall plants to increase the rate of their photosynthetic processes. See Kulivdze, SU 1664182 and SU 1664183 for grapevines. Somewhat analogously, U.S. Pat. No. 4,327,521 suggests for hedgerow type plants such as tea, trimming one side of the plants in each row at an angle, which maximizes exposure to natural light, and harvesting the tea leaves by a cutter at the same angle.

In connection with corn (Zea mays L.) which is a tall plant usually over six feet high at maturity, some academic studies have researched the effects of light on crop yield. In a study by Pendleton et al., reported in 59 Agronomy Journal 395 (1967) and in a study by Winter et al., reported in 62 Agronomy Journal 181 (1970), there are reports of experiments using large reflectors placed near corn plants throughout the growing season to increase the amount of natural light incident on the plants. Ottman et al. reported experiments in 80 Agronomy Journal 619 (1980) in which fluorescent lights placed within the corn canopy increased yields. As might be expected, in an experiment by Early et al., reported in 7 Crop Sciences 151 (1966), shaded corn plants had lower yields.

The reflectors and fluorescent lights used by Pendleton, Winter and Ottman, while necessary to developing their scientific conclusions, do not provide practical, useful or economic means to increase yields. Such apparatus within an open commercial crop field will interfere with or prevent cultivation and application of herbicides and pesticides and will always have to be removed before harvesting to permit the entry of harvesting equipment.

Traditionally, corn and other crops have been planted in rows spaced between 30 inches apart and 36 inches apart, all equally spaced. Such spacing originally arose because of the space required for a horse to pull equipment through a field for planting, cultivation and harvesting. The same spacing continued when horses were replaced by tractors. More recently, there has been a widely accepted trend to plant corn in more narrowly spaced rows. This provides more corn plants in a field of a given size. Since each plant generally produces one ear of corn, it has been felt that with more plants, there will be more ears and hence a higher yield.

As will be seen below, this invention provides a teaching which is directly contrary to the presently accepted approach and even the traditional approach to row spacing. However, the invention does not merely involve wider spacing of rows. Because of the wide variation in the full growth height of corn plants, the invention is defined in terms of the ratio of eventual plant height to row spacing, rather than in terms of specific row spacing measurements.

The invention also makes more practical the use of "inter-cropping". The planting of two or more crops in the same field which can increase the economic return on a particular field.

SUMMARY OF THE INVENTION

Accordingly, the present invention provides a corn planting arrangement for improving crop yields and a method of improving corn crop yields which builds upon the scientific evidence, is also useful, practical and cost effective, will not prevent open field operations during growing or harvesting and is contrary to developments in the prior art.

DETAILED DESCRIPTION OF THE INVENTION

Initially, the structure and growth of a field crop plant such as corn should be understood. Broadly, these are shown in the elevational views of FIGS. 2, 4 and 6. The lower leaves emerge first from the stem. They receive sunlight, perform photosynthesis and contribute to the further growth of the plant stem upward, the root system in the ground, and to their own growth to provide more area to receive sunlight and accelerate the process. However, as the stem grows upward, leaves emerge higher on the stem which are genetically programmed to grow larger than the lower, earlier emerging leaves. As they do this, they tend to shade the lower leaves. This reduces the light received by the lower leaves and their contribution to overall plant growth. Gradually the lower leaves wither and tend to die in whole or in part, further reducing their contribution to plant growth.

As the plant approaches its full growth, the uppermost leaves become even larger and their outermost ends may and, in conventional row spacing usually do, interlace with the leaves in neighboring rows, forming a canopy which shields the leaves below them from sunlight, thus reducing even further their photosynthesis activity and their contribution to the growth of the seeds or corn kernels, maximization of which is the ultimate goal of the farmer.

Figure 1:
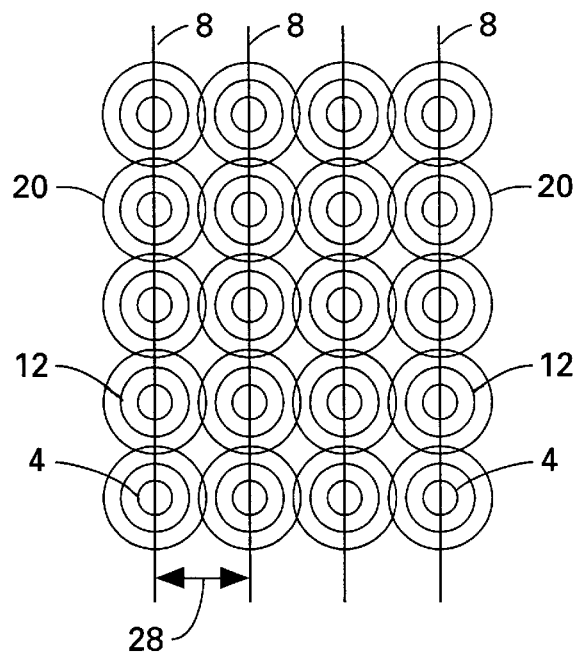
FIG. 1 is a top plan view of a conventional planting arrangement.
Figure 2:
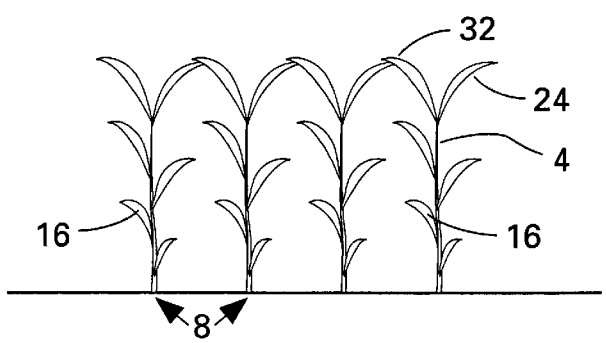
FIG. 2 is an elevational view of the arrangement of FIG. 1.

Conventional arrangements and methods are shown in FIGS. 1 and 2. Individual corn plants are designated by reference numeral 4 and rows of corn plants by reference numeral 8. Circles 12 illustrate the horizontal area occupied by early growth leaves 16 lowest on the plant stem. Circles 20 illustrate the horizontal area occupied by later growth leaves and other later growth structures 24 higher on the plant stem. Typically later growth structures occupy more horizontal area than earlier growth structures. Leaves, in particular, tend to be larger toward the upper end of a plant. Therefore, later growth leaves 24 engage in more photosynthetic activity than early growth leaves 16 and contribute more to the final growth of the plant and the ultimate natural goal of producing the flowers and then the corn kernels to perpetuate the species. The early growth leaves tend to atrophy and die.

In nature, the scheme works well. The larger, higher, later growth leaves are better able to compete for sunlight with nearby plants and produce more offspring of the plant. It is a relatively minor loss to the individual plant that the lower, early growth leaves, being shaded by the upper leaves, contribute less to photosynthetic activity as the plant grows and die off.

The goal of corn plant husbandry, however, is to produce a larger yield of seeds from a collection of plants than is necessary to perpetuate any individual plant line and to use the excess production, directly or indirectly, to support human life. Thus the purpose is not to maximize the survival of the descendants of any individual plant—rather it is to maximize the yield of seeds from a collection of plants, particularly in an open field.

Agriculturalists for centuries, even millennia, have followed the procedure of planting crops in closely spaced rows 8 as shown in FIGS. 1 and 2, which are equally spaced from one another by distance 28 in a field. However, when all the plants are of one type or of similar types, the shading by larger, later growth leaves 24 of smaller, early growth leaves 16 of the same plant and of other plants in the collection reduces photosynthetic activity by the early growth, and reduces total yield from what might result with other arrangements.

Indeed, the result of the extensive growth of upper, later growth structures 24 produces for many crops a canopy 32 which shades the early, lower structures 16 of all of the plants in the field, not just each individual plant, and prevents or minimizes their contribution to photosynthetic activity and crop yield.

The academic studies cited above show that providing more light to growing crops in fields improves yields. Some studies emphasize light on the lower plant structures. But none of the academic studies provide useful, practical means to do so, as Applicant has provided.

The invention was conceived with respect to tall crops such as corn (Zea mays L.), but is not necessarily limited to that specific crop. Even soybeans, which typically reach about three feet in height, produce a canopy which decreases crop yield below the optimum, unless Applicant's invention is used. Therefore, the drawings of plants in the figures are relatively abstract and are not intended to limit the invention to any particular species.

In FIGS. 3, 4, 5 and 6, which illustrate Applicant's invention, for easy comparison with FIGS. 1 and 2, reference numerals correspond to those in the first two figures except as noted. Individual plants 4, plant rows 8, early growth circles 12, early growth leaves 16, later growth circles 20, and later growth structures 24 all have corresponding reference numerals.

Figure 3:
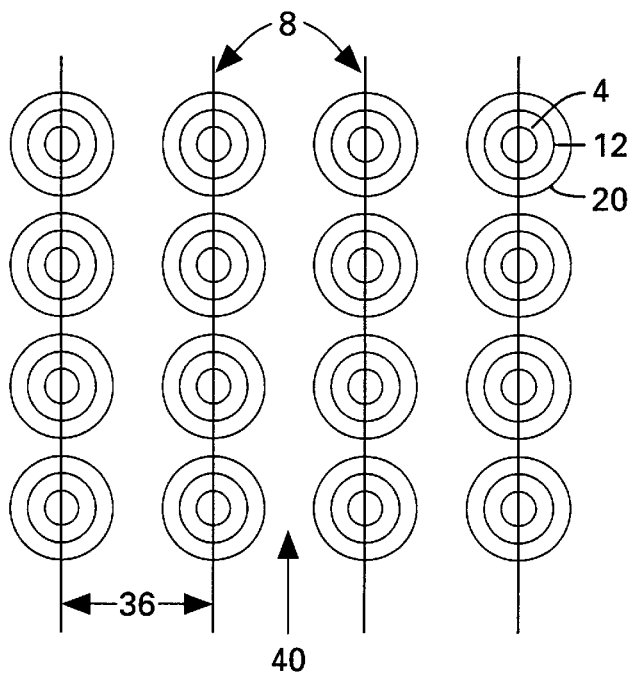
FIG. 3 is a top plan view of a planting arrangement according to the invention.
Figure 4:
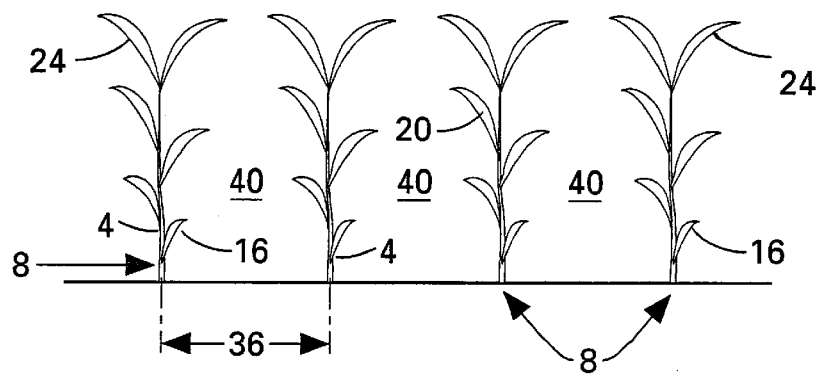
FIG. 4 is an elevational view of the arrangement of FIG. 3.

However, as shown in FIG. 3 and 4, rows 8 are spaced sufficiently from one another by distance 36 so that a canopy does not form between adjacent rows 8. This provides a solar light corridor 40 between adjacent rows 8 so that early growth leaves 16 will continue to receive light and by photosynthesis will continue to contribute to individual plant growth and crop yield as the plants mature and higher, later growth appears.

In some cases, wider spacing of rows, which results in less plants in a given area, could reduce overall yield in a given field even though average yield per plant would increase. This still could be advantageous if the cost of applying herbicide, pesticide and the labor cost of inspection and harvesting could be reduced more than the overall yield return.

Figure 5:
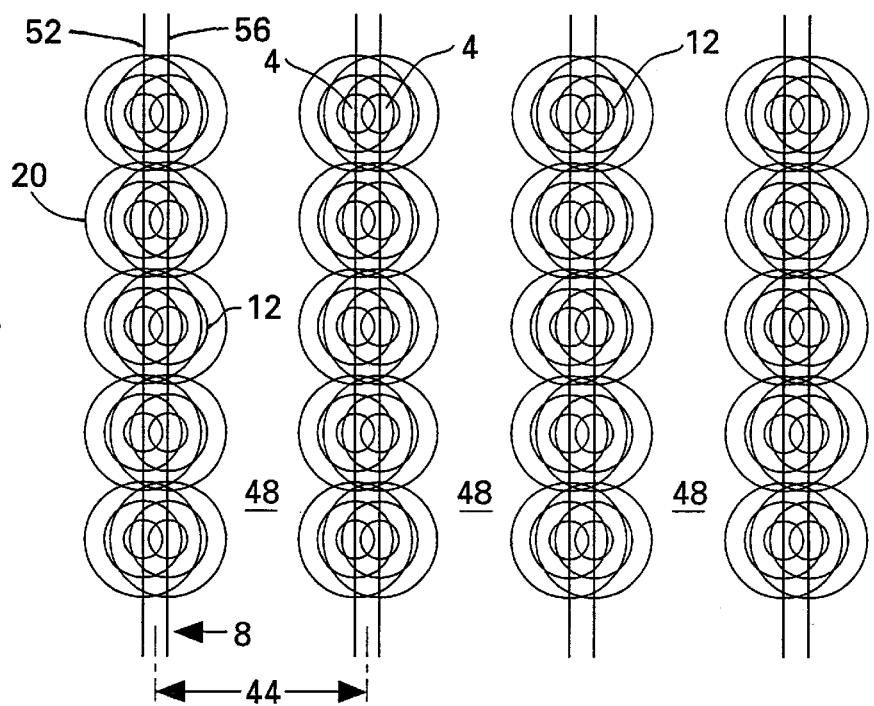
FIG. 5 is a top plan view of another planting arrangement according to the invention.
Figure 6:
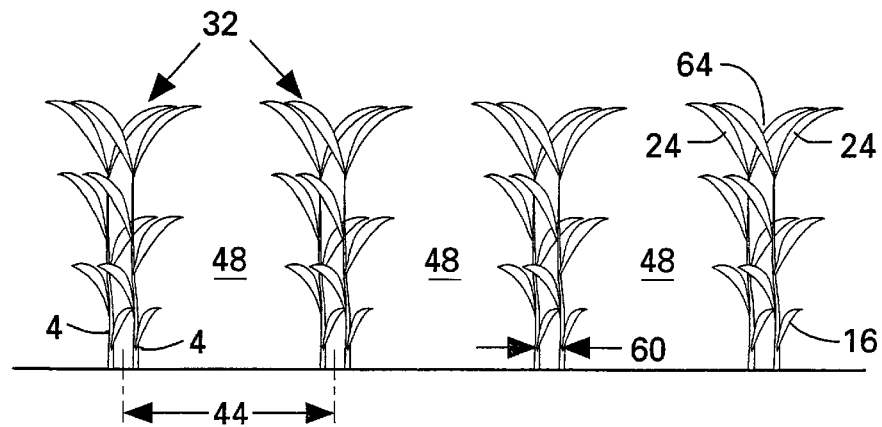
FIG. 6 is an elevational view of the arrangement of FIG. 5.

Applicant has developed a further improvement in the arrangement and method, which is shown in FIGS. 5 and 6. Here rows 8 are also uniformly and widely spaced from one another by distance 44 so that no canopy forms between adjacent rows and solar light corridor 48 is provided between adjacent rows 8. However, as shown in FIGS. 5 and 6, each row 8 comprises at least two sub-rows 52 and 56 of plants 4, spaced apart from one another by distance 60. While a canopy 64 may develop among adjacent plants in the same row 8 and sub-rows 52 and 56, a canopy will not develop over solar light corridor 48. Thus early growth, lower leaves 16 facing each light corridor will continue to live, receive light and engage in photosynthesis. This will contribute an extra push to individual plant growth and crop yield as the plants mature.

In this arrangement, when each row 8 comprises exactly two sub-rows 52 and 56, approximately one-half of the lower growth on each plant is adjacent a light corridor 48 and continues to contribute to plant growth as the plant matures. If there were three or more sub-rows, the plants in the interior sub-rows would not have this advantage. Hence, it is believed that the arrangement in FIGS. 5 and 6 will usually be the optimum.

Total crop yield for a field will partly depend on the number of plants in the field. Using Applicant's arrangement and methods, the total yield of plants in a field may be equal to or even greater than in conventional arrangements and methods. For example, in a conventional field as shown in FIGS. 1 and 2, rows of corn might be spaced thirty inches apart, that is, distance 28 would be thirty inches. In such a field which is one hundred feet wide, there would be forty-one rows counting one row at one edge of the field.

In the arrangement shown in FIGS. 3 and 4, the distance 36 between rows may be forty-eight inches. In a one hundred foot wide field, there would be twenty-six rows. If then the plant spacing in each row were the same as in FIGS. 1 and 2, the number of plants would be 63.4% of those in FIGS. 1 and 2. However, the wider spacing which provides a solar light corridor 40 makes it possible for each plant to produce a higher yield than it would without such a corridor, because of the greater photosynthetic activity of the lower growth 16. Thus a result may be obtained which is surprising—plant less plants and obtain equal or greater total yields.

It may be possible to increase the number of plants in each row beyond what is conventional. This is because the solar corridor 40 increases the incident light used by the plant so that each plant will grow as well or better than it would in the conventional arrangement. Further, each plant is less crowded horizontally and perpendicularly to the row length and can compensate for the increased crowding along the row length by expanding its root system horizontally and perpendicularly to the row length. The increased crowding along the row length can stimulate the plant to expand its root system further downward into the soil. Thus, the intake of moisture and nutrients from the soil may be just as great as or greater than in conventional methods.

In the arrangement shown in FIGS. 5 and 6, each row is spaced from other rows by distance 44 which may be sixty inches, for example. Distance 44 is measured between a center line midway between sub-rows 52 and 56. A field 100 feet wide would therefore have twenty-one rows counting one row at the edge of each field. However, each row, as shown, includes two sub-rows 52 and 56, spaced from one another by, say, seven inches. Thus, such a field would have a total of forty-two sub-rows, one more than the number of rows in the field discussed in connection with FIGS. 1 and 2.

Even if individual plant yield is exactly the same, this would increase total yield for the field by 2.6%. Although such an increase in yield might seem to be small, it all goes to the bottom line of the farmer's profits and, if the arrangement and method is widely adopted, could greatly increase crop production in the aggregate.

Further, as explained above in connection with FIGS. 3 and 4, the solar light corridor 48 enables continued and greater contribution to the photosynthetic activity of lower, early growth structures 16, which otherwise might die off at an earlier time thus increasing the yield of each plant and, of course, the total yield from the field. Partly this is due to the increased photosynthetic activity of the lower leaves contributing more to production of above-ground structures of the plant. Additionally, the larger distance 44 between rows allows expansion of the root system of each plant horizontally and perpendicularly to each row and encourages downward expansion of the root system so that plants in the same row may be planted closer together without loss of individual plant yield and with an increase in total yield.

The solar corridor Applicant's invention provides has still another advantage. Plant growth is often adversely affected by cooler soil and excessive soil moisture early in the growing season. The solar corridor alleviates both of these conditions by drying and warming the soil.

Traditionally, since the advent of multiple row machines for cultivating, treating and harvesting crops, farmers have planted all types of crops in equally spaced rows. The approach coincided with the advent of mass production in industry. Today, manufacturing is trending toward more individualized production. Similarly, farmers are now engaging in low till and no-till operations for environmental and legal reasons which require a more detailed approach to each field and parts thereof. Application of chemicals to the soil on a large scale is being replaced by plot by plot analysis of soil conditions and application of only what is needed, where it is needed. This approach makes the use of Applicant's method and arrangement more acceptable to traditional farmers.

Also, traditionally, at least in the United States, crop fields have been laid out parallel to township and section boundaries which run north and south and east and west. Changes have been made to accommodate roads, especially interstate highways which do not follow such boundaries. Often such improvements have resulted in crop fields with triangular ends. Large farming equipment used in such fields results in the destruction of parts of the field as the equipment turns around.

Applicant's invention further provides the possibility of a different orientation of crop rows which will improve yields and can also avoid some of these problems, taking advantage of the solar light corridor disclosed above.

The traditional procedure for a farmer is to decide on the crop he wishes to grow in a particular field. Then he plants the crop as early as he can enter the field with his equipment, depending on soil conditions, moisture and temperature and depending on his guess as to future weather conditions. He does not want to plant so early that a late frost may destroy the plants or so late that the plants may not have a long enough growing period to produce a large crop. Previously, even in the prior year, after the last crop was harvested he may have tested the soil and applied chemicals or treated the soil by cultivation. Much of this is guesswork and even today the National Weather Service and the Old Farmer's Almanac may be equally relied upon. The traditional farmer generally believes that a longer time between planting and harvesting is better.

Applicant's invention takes a different approach. First, the desired harvest time for the crop is determined or selected. This can be based on expected weather conditions or market conditions including historical trends and the farmer's market strategy—for example, selling upon harvest, storing for future sale or selling futures. Second, a specific variety of plants is selected or determined which is capable of being ready for harvest at the selected harvest time.

Then the optimum time of planting of the variety is determined so that the plants will be ready for harvesting at the selected harvest time. If it turns out that this time is earlier than the practical time of planting, considering the condition of the field, another harvest time and variety is selected.

Next, the period of time between the optimum time of planting and the selected harvest time when the photosynthetic activity in the plants contributes most to crop production is determined. This can be determined from many studies by agronomists for particular crops.

Next, using this period of time and the location of the field by longitude and latitude, the farmer determines the orientation of the crop rows which will produce the greatest sunlight during such period between the crop rows—that is, within the solar light corridors. This may not be a straight north-south or east-west orientation as in traditional arrangements.

Finally, the plant rows are planted at substantially the selected planting time in the selected orientation either in accordance with the single row arrangement shown in FIGS. 3 and 4 or in the row and sub-row arrangement shown in FIGS. 5 and 6. If the crop fails due to unpredictable natural events such as freezing, excess rain, flooding or drought, the process is repeated.

A further improvement in the arrangement and method utilizes the solar corridor 40 and 48 for the planting of supplementary additional crops of a different species. In experiments, the following secondary crops have been planted in the solar corridors: soybeans, peas, alfalfa, snow peas, potatoes, sweet clover, hay and wheat. All of such supplementary crops have in common that their full height is less than the primary crop and/or that their rate of growth and/or heights at various times during the growing season were such as to not interfere substantially with photosynthetic activity of the lower growth structures of the primary crop.

Another consideration in selecting such secondary crops is the overall effect on the primary crop caused by competition between the crops for moisture and nutrients. On the other hand, some secondary crops such as legumes can enrich the soil for the primary crop. Conceivably this could eliminate the traditional Midwestern rotation between corn and soybeans. Both crops could be planted in the same field in the same year, eliminating a farmer's risk of depending on only one crop. Some secondary crops with genetic engineering, could even have pesticidal or herbicidal effects which could assist the growth of the primary crop, or vice versa. The risks of crop pests increases in low till and no till farming.

Applicant has conducted a large number of experimental plantings of corn using his method and arrangement and the results are summarized in Tables 1–14 below. In all of the Tables, the conditions in the side by side control plots were the same as in the experimental plots except as noted. Yield, as previously noted, is based on the No. 2 Yellow Corn standard measurement. All varieties used had an average full growth height of 102 inches and it is from this that the ratio of row spacing and sub-row spacing to height has been calculated.

Table 1 sets forth the ranges of variables and results for all of these experiments using twenty different corn varieties. The average yield from plantings using Applicant's arrangement and method was 103% of the yield from control plot plantings.

TABLE 1

Ranges

Location of Fields: East Central Illinois and South Central Minnesota

Latitude: 40° 17' to 44° 43' N

Longitude: 87° 50' to 93° 30' W

Desired Harvest Time: October 15

Number of Varieties: 20 different corn

Planting Time: April 12 to May 17

Optimum Crop Growth Period: June 20 to September 10

Row Orientation: 0°–180° to 90°–270°

Row Spacing: 56" to 76"

Ratio of Row Spacing to Height: Between 56 to 102 and 76 to 102

Sub-Row Spacing: 6" to 8" (some plantings had no sub-rows)

Ratio of Sub-Row Spacing to Height: Between 6 to 102 and 8 to 102
Plant Population Per Acre: 15,000 to 33,000
Soils: Various
Yield Per Acre: 48 to 228.3 bu.
Control Fields: Row spacing: 28" to 38"
Ratio of Row Spacing to Height: Between 28 to 102 and 38 to 102
Yield per acre: 29 to 226.9 bu.
Note: Low yield fields were subject to adverse conditions, such as drought Table 2 sets forth the ranges of variables and results for experiments using seven commercially available corn varieties identified in the Table. The average yield from plantings using Applicant's arrangement and method was 104% of the yield from control plot plantings.

TABLE 2

Location of Fields: East Central Illinois
Latitude: 40° 28", 40° 30', and 40° 46' N
Longitude: 88° 08', 88° 10', and 87° 50' W
Desired Harvest Time: October 15
Varieties: Prairie Stream 702, Prairie Stream 704, Cargill 7877, Cargill 7977, DEKALB 671, DEKALB 711 and Golden Harvest 2540
Planting Time: May 4, 5, and 7
Optimum Crop Growth Period: June 20 to September 10
Row Orientation: 0°–180°
Row Spacing: 60" and 72"
Ratio of Row Spacing to Height: Between 60 to 102 and 72 to 102
Sub-Row Spacing: 6" and 8"
Ratio of Sub-Row Spacing to Height: Between 6 to 102 and 8 to 102
Soils: Brenton, Elliott, Ashkum, Gilford Very Fine Sandy Loam
Yield Per Acre: 189 bu.
Control Fields: Row spacing: 30" and 36"
Ratio of Row Spacing to Height: Between 30 to 102 and 36 to 102
Row orientation: 0°–180°
Yield per acre: 182 bu.

Table 3 sets forth the ranges of variables and results for experiments using only three of the seven commercially available corn varieties as identified in the Table. The average yield from plantings using Applicant's arrangement and method was 111% of the yield from control plot plantings.

TABLE 3

Location of Field: East Central Illinois
Latitude: 40° 28', 40° 30', and 40° 46' N
Longitude: 88° 08', 88° 10', and 87°50' W
Desired Harvest Time: October 15
Varieties: DEKALB 711, Cargill 7877 and Prairie Stream 702
Planting Time: May 4, 6, and 7
Optimum Crop Growth Period: June 20 to September 10
Row Orientation: 0°–180°
Row Spacing: 60" and 72"
Ratio of Row Spacing to Height: Between 60 to 102 and 72 to 102
Sub-Row Spacing: 6" and 8"
Ratio of Sub-Row Spacing to Height: Between 6 to 102 and 8 to 102
Plant Population Per Acre: 30,000
Soils: Brenton, Elliott, Ashkum, Gilford Very Fine Sandy Loam
Yield Per Acre: 213 bu.
Control Field: Row spacing: 30" and 36"
Ratio of Row Spacing to Height: Between 30 to 102 and 36 to 102
Row orientation: 0°–180°
Yield per acre: 193 bu.

In order to provide complete disclosure, Tables 4 and 5 set forth two experiments with less favorable results. These experiments used a variety called Golden Harvest 2540. The yield results were 95.6% and 100%, respectively, of the control plot results.

Applicant speculates from these experiments that this variety, for unknown reasons, is not as responsive to Applicant's method as other varieties. This is not believed to detract from the utility of the invention. The overall results using Applicant's invention and a plurality of other varieties, even including this variety, as shown in Tables 1 and 2 are superior to results in the control plots.

TABLE 4

Location of Field: East Central Illinois
Latitude: 40° 46' N
Longitude: 87° 50' W
Desired Harvest Time: October 15
Variety: Golden Harvest 2540
Planting Time: May 7
Optimum Crop Growth Period: June 20 to September 10
Row Orientation: 0°–180°
Row Spacing: 60"
Ratio of Row Spacing to Height: 60 to 102
Sub-Row Spacing: 7½"
Ratio of Sub-Row Spacing to Height: 7.5 to 102
Plant Population Per Acre: 30,000
Soil: Gilford Very Fine Sandy Loam
Yield Per Acre: 195 bu.
Control Field: Row spacing: 30"
Ratio of Row Spacing to Height: 30 to 102
Row orientation: 0°–180°
Yield per acre: 204 bu.

TABLE 5

Location of Field: East Central Illinois
Latitude: 40° 30' N
Longitude: 88° 08" W
Desired Harvest Time: October 15
Variety: Golden Harvest 2540
Planting Time: May 4
Optimum Crop Growth Period: June 20 to September 10
Row Orientation: 0°–180°
Row Spacing: 60"
Ratio of Row Spacing to Height: 60 to 102

Sub-Row Spacing: 6" to 7"
Ratio of Sub-Row Spacing to Height: Between 6 to 102 and 7 to 102
Plant Population Per Acre: 30,000
Soils: Elliott (North ½), Ashkum (South ½)
Yield Per Acre: 190 bu.
Control Field: Row spacing: 30"
Ratio of Row Spacing to Height: 30 to 102
Row orientation: 0°–180°
Yield per acre: 190 bu.

Tables 6, 7, 8 and 9 show results of some of Applicant's most successful experiments which used the variety called Prairie Stream 702. The yield results using Applicant's invention in several different soils were 113% (Table 6), 118.5% (Table 7), 123% (Table 8) and 139.2% (Table 9) of the results from side by side control plots.

TABLE 6

Location of Field: East Central Illinois
Latitude: 40° 28' N
Longitude: 88° 08' W
Desired Harvest Time: October 15
Variety: Prairie Stream 702
Planting Time: May 6
Optimum Crop Growth Period: June 20 to September 10
Row Orientation: 0°–180°
Row Spacing: 72"
Ratio of Row Spacing to Height: 72 to 102
Sub-Row Spacing: 7"
Ratio of Sub-Row Spacing to Height: 7 to 102
Plant Population Per Acre: 30,000
Soil: Brenton
Yield Per Acre: 217 bu.
Control Field: Row spacing: 36"
Ratio of Row Spacing to Height: 36 to 102
Row orientation: 0°–180°
Yield per acre: 192 bu.

TABLE 7

Location of Field: East Central Illinois
Latitude: 40° 30' N
Longitude: 88° 08' W
Desired Harvest Time: October 15
Variety: Prairie Stream 702
Planting Time: May 4
Optimum crop Growth Period: June 20 to September 10
Row Orientation: 0°–180°
Row Spacing: 60"
Ratio of Row Spacing to Height: 60 to 102
Sub-Row Spacing: 6" to 7"
Ratio of Sub-Row Spacing to Height: Between 6 to 102 and 7 to 102
Plant Population Per Acre: 30,000
Soils: Elliott (North ½), Ashkum (South ½)
Yield Per Acre: 211 bu.
Control Field: Row spacing: 30"
Ratio of Row Spacing to Height: 30 to 102
Row orientation: 0°–180°
Yield per acre: 178 bu.

TABLE 8

Location of Field: East Central Illinois
Latitude: 40° 28", 40° 30", and 40° 46' N
Longitude: 88° 08', 88° 10', and 87° 50' W
Desired Harvest Time: October 15
Variety: Prairie Stream 702
Planting Time: May 4, 6, and 7
Optimum Crop Growth Period: June 20 to September 10
Row Orientation: 0°–180°
Row Spacing: 60" and 72"
Ratio of Row Spacing to Height: Between 60 to 102 and 72 to 102
Sub-Row Spacing: 6" to 8"
Ratio of Sub-Row Spacing to Height: Between 6 to 102 and 8 to 102
Plant Population Per Acre: 30,000
Soils: Brenton, Elliott, Ashkum, Gilford Very Fine Sandy Loam
Yield Per Acre: 214 bu.
Control Field: Row spacing: 30" and 36"
Ratio of Row Spacing to Height: Between 30 to 102 and 36 to 102
Row orientation: 0°–180°
Yield per acre: 174 bu.

TABLE 9

Location of Field: East Central Illinois
Latitude: 40° 46' N
Longitude: 87° 50' W
Desired Harvest Time: October 15
Variety: Prairie Stream 702
Planting Time: May 7
Optimum Crop Growth Period: June 20 to September 10
Row Orientation: 0°–180°
Row Spacing: 60"
Ratio of Row Spacing to Height: 60 to 102
Sub-Row Spacing: 7½"
Ratio of Sub-Row Spacing to Height: 7.5 to 102
Plant Population Per Acre: 30,000
Soil: Gilford Very Fine Sandy Loam
Yield Per Acre: 213 bu.
Control Field: Row spacing: 30"
Ratio of Row Spacing to Height: 30 to 102
Row orientation: 0°–180°
Yield per acre: 153 bu.

Tables 10, 11 and 12 show results of some of Applicant's experiments using the variety called Cargill 7877. The yield results using Applicant's invention in different soils were 102.3% (Table 10), 106.5% (Table 11) and 109.7% (Table 12) of the results from side by side control plots.

TABLE 10

Location of Field: East Central Illinois
Latitude: 40° 46' N
Longitude: 87° 50' W
Desired Harvest Time: October 15
Variety: Cargill 7877
Planting Time: May 7
Optimum Crop Growth Period: June 20 to September 10
Row Orientation: 0°–180°
Row Spacing: 60"
Ratio of Row Spacing to Height: 60 to 102
Sub-Row Spacing: 7½"

Ratio of Sub-Row Spacing to Height: 7.5 to 102
Plant Population Per Acre: 30,000
Soil: Gilford Very Fine Sandy Loam
Yield Per Acre: 219 bu.
Control Field: Row spacing: 30"
Ratio of Row Spacing to Height: 30 to 102
Row orientation: 0°–180°
Yield per acre: 214 bu.

TABLE 11

Location of Field: East Central Illinois
Latitude: 40° 30' N
Longitude: 88° 08' W
Desired Harvest Time: October 15
Variety: Cargill 7877
Planting Time: May 4
Optimum Crop Growth Period: June 20 to September 10
Row Orientation: 0°–180°
Row Spacing: 60"
Ratio of Row Spacing to Height: 60 to 102
Sub-Row Spacing: 6" to 7"
Ratio of Sub-Row Spacing to Height: Between 6 to 102 and 7 to 102
Plant Population Per Acre: 30,000
Soils: Elliott (North ½), Ashkum (South ½)
Yield Per Acre: 228 bu.
Control Field: Row spacing: 30"
Ratio of Row Spacing to Height: 30 to 102
Row orientation: 0°–180°
Yield per acre: 214 bu.

TABLE 12

Location of Field: East Central Illinois
Latitude: 40° 28' N
Longitude: 88° 08" W
Desired Harvest Time: October 15
Variety: Cargill 7877
Planting Time: May 6
Optimum Crop Growth Period: June 20 to September 10
Row Orientation: 0°–180°
Row Spacing: 72"
Ratio of Row Spacing to Height: 72 to 102
Sub-Row Spacing: 7"
Ratio of Sub-Row Spacing to Height: 7 to 102
Plant Population Per Acre: 30,000
Soil: Brenton
Yield Per Acre: 227 bu.
Control Field: Row spacing: 36"
Ratio of Row Spacing to Height: 36 to 102
Row orientation: 0°–180°
Yield per acre: 207 bu.

Tables 13 and 14 show results of two experiments in different soils with different row and sub-row spacings using the variety called DEKALB 711. Table 13 shows a yield of 117.1% of the control plot yield. Table 14 shows a yield of only 97.4% of the control plot yield. In Applicant's complete experiments it was found that yields of less than 100% of control plot yields occurred in only 8.33% of the experiments, meaning that improved yields resulted in 91.67% of the experiments. Even when control plot yields exceeded 200 bu. per acre, Applicant's method and arrangement resulted in improved yields in 75% of the experiments.

TABLE 13

Location of Field: East Central Illinois
Latitude: 40° 46' N
Longitude: 87° 50' W
Desired Harvest Time: October 15
Variety: DEKALB 711
Planting Time: May 7
Optimum Crop Growth Period: June 20 to September 10
Row Orientation: 0°–180°
Row Spacing: 60"
Ratio of Row Spacing to Height: 60 to 102
Sub-Row Spacing: 7½"
Ratio of Sub-Row Spacing to Height: 7.5 to 102
Plant Population Per Acre: 30,000
Soil: Gilford Very Fine Sandy Loam
Yield Per Acre: 192 bu.
Control Field: Row spacing: 30"
Ratio of Row Spacing to Height: 30 to 102
Row orientation: 0°–180°
Yield per acre: 164 bu.

TABLE 14

Location of Field: East Central Illinois
Latitude: 40° 28' N
Longitude: 88° 08' W
Desired Harvest Time: October 15
Variety: DEKALB 711
Planting Time: May 6
Optimum Crop Growth Period: June 20 to September 10
Row Orientation: 0°–180°
Row Spacing: 72"
Ratio of Row Spacing to Height: 72 to 102
Sub-Row Spacing: 7"
Ratio of Sub-Row Spacing to Height: 7 to 102
Plant Population Per Acre: 30,000
Soil: Brenton
Yield Per Acre: 221 bu.
Control Field: Row spacing: 36"
Ratio of Row Spacing to Height: 36 to 102
Row orientation: 0°–180°
Yield per acre: 227 bu.

Various changes and modifications in applicant's method and arrangement will be apparent to those skilled in the art having the benefit of Applicant's invention, which will fall within the scope of the following claims.

What is claimed is:

1. An arrangement for improving the yield of corn crops comprising a plurality of parallel rows of corn plants having an average full growth height of 102 inches spaced from one another sufficiently to provide solar light corridors between said rows to provide increased solar energy to said corn plants to increase their photosynthetic activity and wherein the ratio of said space between said rows to the average full growth height of said plants is between 55% and 75%.

2. An arrangement for improving the yield of corn crops according to claim 1 further including a plurality of plants other than corn planted in a row within each of said solar light corridors, said plants other than corn being shorter than said corn plants so as not to reduce said yield of said corn crops while producing an additional crop yield.

3. An arrangement for improving the yield of corn crops according to claim 1 wherein each of said rows is oriented so as to optimize the exposure of structures of said plants to solar energy during the period of time when photosynthetic activity in said structures of said plants contributes most to the production of crops.

4. An arrangement for improving the yield of corn crops according to claim 1 wherein each of said rows comprises at least two closely spaced sub-rows.

5. An arrangement for improving the yield of corn crops according to claim 4 wherein the ratio of said space between said sub-rows to the average full growth height of said plants is between about 6% and about 8%.

6. An arrangement for improving the yield of corn crops according to claim 1 wherein said solar light corridors are sufficiently wide to permit solar energy to reach lower plant structures in each of said corn plants.

7. An arrangement for improving the yield of corn crops according to claim 1 and further comprising:

selecting a desired harvest time for said crop, selecting a variety of corn which is capable of being ready for harvest at said selected harvest time, determining an optimum time of planting of said variety of said corn so that plants of said corn will be ready for harvesting at said selected harvest time, and planting said plants at substantially said optimum time of planting.

8. An arrangement for improving the yield of corn crops according to claim 7 and further comprising determining the period of time between said optimum time of planting and said selected harvest time when photosynthetic activity in said corn plant contributes most to crop production, and planting said corn crop at such time that the greatest exposure of said crop to solar energy is during such period of time when photosynthetic activity contributes most to crop production.

9. An arrangement for improving the yield of corn crops according to claim 8 and further comprising determining, for said period of time when said photosynthetic activity in said plant contributes most to crop production, the orientation of solar light with respect to said field, and planting said crop according to said determined orientation to optimize the incidence of solar light on said plants.

10. An arrangement for improving the yield of corn crops according to claim 7 wherein each of said rows is spaced sufficiently from adjacent rows so that solar light between said rows reaches lower photosynthetic structures of each of said plants.

11. An arrangement for improving the yield of corn crops according to claim 7 and further comprising planting a secondary crop between said adjacent rows.

* * * * *